3,139,412
CALKING AND SEALING COMPOSITION CONTAINING POLYPROPYLENE

George B. Sterling, Midland, Mich., assignor to The Dow Chemical Company, Midland, Mich., a corporation of Delaware
No Drawing. Filed Mar. 17, 1961, Ser. No. 96,393
3 Claims. (Cl. 260—23)

This invention concerns new compositions of matter suitable for sealing cracks, crevices, joints and leaks to make them waterproof and pertains especially to such compositions containing polypropylene which compositions are characterized by their adhesiveness, flexibility and alkali-, acid- and water-resistant properties.

Compositions for sealing cracks, crevices, joints and leaks to make them waterproof are commonly prepared by compounding or blending a drying oil, e.g. linseed oil, with a filler such as a finely divided clay, talc, or short asbestos fibers and a solvent to form a paste or putty-like material which can be pressed or forced into cracks, crevices or fissures by ordinary hand pressure or from a calking gun, thereby making them waterproof.

However, the making of calking compositions is much more involved than the mere blending of a mixture of ingredients into a homogeneous putty or dough-like mass. The mixtures are in reality very complex physical and chemical structures which must serve a variety of purposes in their use as putty, calking and glazing compounds and in addition must be of such character as to withstand a variety of out-of-doors weathering conditions when used in different regions or climates. For these reasons calking compositions, prepared for example, by blending a drying oil such as linseed oil with a filler such as finely divided clay, talc, or short asbestos fibers, and a solvent to form a paste or putty-like material which can be pressed into cracks, crevices or fissures by ordinary hand pressure with a putty knife or pressed from a calking gun by moderate hand pressure, have not been entirely satisfactory because the compositions have a tendency to become brittle and crack upon aging or upon out-of-doors weathering and rapidly lose their adhesiveness.

It is an object of the invention to provide new sealing compositions for making cracks, crevices, fissures and joints waterproof which compositions are characterized by adhesiveness and good resistance to embrittling and cracking upon exposure to out-of-doors weathering. Another object is to provide sealing compositions comprised of a relatively low molecular weight polypropylene blended with fillers to form putty-like materials which can be pressed into cracks, crevices, fissures, joints and the like by ordinary hand pressure, and which compositions possess good adhesiveness and high resistance to embrittling upon exposure to out-of-doors weathering.

According to the invention a sealing composition possessing superior adhesive properties and excellent resistance to embrittling upon exposure to out-of-doors weathering can readily be prepared by incorporation an amorphous or predominantly amorphous polypropylene with inert inorganic fillers such as clay, talc, asbestos fibers, silica, barium sulfate, calcium carbonate or the like, together with a plasticizer and a solvent as hereinafter described.

The polymeric ingredient to be employed in making the compositions of the invention can be an amorphous or predominantly amorphous homopolymer or copolymer of propylene, e.g. a polymer having not more than 10 percent crystallinity as determined by X-ray diffraction patterns, and consisting of at least 90 percent by weight of propylene chemically combined or interpolymerized with not more than 10 percent by weight of one or more other ethylenically unsaturated aliphatic hydrocarbons such as ethylene, butene, butadiene and the like, which propylene polymers are soluble in, or miscible with, saturated aliphatic hydrocarbons such as petroleum ether and white mineral oils, are soft tacky to non-tacky rubbery polymers and have a melt viscosity of from about 100 to 200 as determined by procedure described in ASTM D1238–57T. The homopolymers of propylene are preferred. The polymeric material can be used in amounts of from about 4 to about 30 parts by weight per 100 parts by weight of the composition.

The inorganic filler can be any inert finely divided material, preferably an inorganic material such as finely divided clay, calcium carbonate, barium sulfate, silica, ground mineral wool or asbestos fibers, zinc oxide, lithopone, talc or the like. The preferred inorganic fillers are fibrous talc, clay and short asbestos fibers or mixtures thereof. The inorganic fillers can be used in amounts of from 30 to 70 percent by weight of the composition.

Plasticizers such as white mineral oil or vegetable oils, preferably the latter in the form of heat-bodied drying oils such as linseed oil, dehydrogenated castor oil, tung oil, soy bean oil, safflower oil, or the like, having a viscosity between Z1 and Z9 Gardner-Holdt are employed in amounts of from 15 to 40 percent by weight of the composition. Mixtures of mineral, e.g. white mineral oil, and drying oils can also be used. White mineral oils boiling between about 200° and 600° C., and having a viscosity between 10 and 70 centistokes at 100° F. are suitable.

A thinning liquid aliphatic hydrocarbon solvent consisting principally of saturated aliphatic hydrocarbons boiling at temperatures between 60° and 205° C., e.g. petroleum ether, is usually required in the composition. The thinner can be employed in amounts of from 5 to 15 percent by weight of the composition.

The compositions are prepared by incorporating the polypropylene or propylene polymer with the inert filler, the mineral and/or drying oil plasticizer and the saturated aliphatic hydrocarbon solvent or thinner in the desired proportions, on compounding rolls, a Banbury mixer or a plastics extruder, to form a uniform homogeneous plastic material having a soft to stiff dough-like consistency and capable of being forced into a ⅛-inch crack or crevice by ordinary hand pressure. The consistency of the composition will vary somewhat depending upon the intended use. The composition should not be thinned to such an extent that it sags when subjected to a sag or slump test such as that described in the bulletin published July 15, 1955, by the Aluminum Window Manufacturing Association, 75 West Street, New York 6, New York, and should not be so stiff that it cannot readily be forced from a calking gun by hand pressure.

The compositions of the invention do not sag or flow of their own weight when a triangular body of the material is formed in a 1-inch wide by ½-inch deep channel and placed in an oven in a vertical position with the 1-inch side of the triangular mass in a vertical position and the apex of the triangular body on the bottom and heated at a temperature of 50° C. for a period of 8 hours.

The compositions of the invention possess good adhesiveness to metal, wood or glass, have excellent resistance to embrittling and cracking upon exposure to out-of-doors weathering, do not tend to sag or wrinkle and are useful for sealing cracks, crevices. joints, fissures and the glazing of window glass to make them waterproof.

The following examples illustrate ways in which the principle of the invention has been applied, but are not to be construed as limiting its scope.

*Example 1*

A rubbery amorphous polypropylene having a melt index between 100 and 200 as determined by procedure similar to that described in ASTM D1238-57T was employed to prepare a calking composition by compounding the polypropylene, together with other ingredients into a homogeneous mass employing the recipe:

| Ingredients— | Parts by weight |
|---|---|
| Polypropylene | 20 |
| Talc (Nytol 200, a fibrous talc) | 15 |
| Asbestos shorts | 20 |
| Saturated aliphatic hydrocarbon solvent (B.P. 60°–100° C.) | 5 |
| Saturated aliphatic hydrocarbon solvent (B.P. 100°–140° C.) | 5 |
| Bodied linseed oil (Z7–Z8 viscosity) | 35 |
| | 100 |

The ingredients were blended into a uniform composition on a pair of laboratory compounding rolls at room temperature. The product was a soft, tacky material which could readily be extruded from a calking gun with moderate hand pressure and when used to seal crevices, cracks, or window glass, was waterproof and showed no tendency to sag or to become embrittled upon aging by exposure to out-of-doors weathering for a period of 12 months.

In specific tests of the product the composition was employed to seal a ⅝ inch glass window pane in a wood frame. The unit was exposed to out-of-doors weathering for a period of 12 months at about latitude 44° north in the State of Michigan. Thereafter, the calking was observed and found to be in excellent condition. It was free from cracks and had good adhesion to both the wood and the glass.

Other portions of the compositions were tested for sag, shortly after the composition was prepared. The procedure for determining sag was to fill a steel channel 1-inch wide by ½-inch deep by 8 inches long made from No. 28 U.S. gauge metal with a triangular body of the composition and place the so-filled channel in an oven with the 1-inch side of the right angle of the body of the material in a vertical position and the point of the triangular body of the material on the bottom of the channel and heat the mass at a temperature of 50° C. for a period of 7 hours. Thereafter, the material was observed for sagging or slumping of the material towards the bottom of the channel. The composition was free from sag under this test.

*Example 2*

Polypropylene having a melt index of about 150 was used to prepare a calking composition by blending it with other ingredients employing the recipe:

| Ingredients— | Parts by weight |
|---|---|
| Polypropylene | 4 |
| Clay No. 33 [1] | 5 |
| Talc (Nytol 200, a fibrous talc) | 20 |
| Asbestos shorts | 25 |
| Saturated aliphatic hydrocarbon solvent (B.P. 60°–100° C.) | 5 |
| Saturated aliphatic hydrocarbon solvent (B.P. 100°–140° C.) | 5 |
| Bodied linseed oil (Z7–Z8 viscosity) | 15 |
| White mineral oil (B.P. 200–275° C./.3 mm.) | 21 |
| | 100 |

[1] Clay No. 33.

It was a finely divided inert material of a cream color having 38 percent by weight of its particles of sizes below 2 microns and consisting of 43.75 percent by weight of $Al_2O_3$, 54.0 percent $SiO_2$, 0.25 percent $Fe_2O_3$, 0.75 percent $TiO_2$ and 1.25 percent $K_2O \cdot Na_2O$, by analysis.

The calking composition could readily be extruded from a calking gun with moderate hand pressure and when used to seal crevices, cracks, or window glass, to wood, metal or glass was waterproof and showed no tendency to sag or become embrittled and crack upon exposure to out-of-doors weathering for a period of 12 months.

I claim:

1. A calking composition for sealing crevices, cracks, leaks and joints to make them waterproof, consisting essentially of a homogeneous intimate mixture of (A) from about 4 to about 30 percent by weight of an amorphous rubbery propylene polymer consisting of at least 90 percent by weight of propylene and not more than 10 percent of another ethylenically unsaturated aliphatic hydrocarbon, (B) from 15 to 40 percent by weight of a plasticizer selected from the group consisting of a bodied drying oil having a viscosity between Z1 and Z9 and a white mineral oil, (C) from 5 to 15 percent by weight of a liquid hydrocarbon solvent consisting principally of saturated aliphatic hydrocarbons boiling at temperatures between 60° and 205° C., and (D) from 30 to 70 percent by weight of an inert finely divided filler per 100 parts by weight of said composition.

2. A composition as claimed in claim 1, wherein the propylene polymer is polypropylene.

3. A calking composition for sealing crevices, cracks, leaks and joints to make them waterproof, consisting essentially of a homogeneous intimate mixture of (A) from 4 to 30 percent by weight of amorphous polypropylene having a melt index of from about 100 to 200, (B) from 15 to 40 percent by weight of a bodied linseed oil having a viscosity between Z1 and Z9, (C) from 5 to 15 percent by weight of a liquid saturated aliphatic hydrocarbon solvent boiling at temperatures between 60° and 205° C., and (D) from 30 to 70 percent by weight of a finely divided filler selected from the group consisting of talc, clay and asbestos fibers and mixtures thereof per 100 parts by weight of the composition.

No references cited.